United States Patent [19]
Sterett

[11] Patent Number: 5,358,211
[45] Date of Patent: Oct. 25, 1994

[54] TOOLING AND METHOD OF MAKING

[75] Inventor: Robert A. Sterett, Jackson, Mich.

[73] Assignee: Aeroquip Corporation, Maumee, Ohio

[21] Appl. No.: 46,981

[22] Filed: Apr. 13, 1993

[51] Int. Cl.⁵ .................. B29C 33/02; B29C 33/40
[52] U.S. Cl. ......................... 249/80; 249/79; 249/111; 264/22; 264/225
[58] Field of Search ............ 249/79, 80, 111; 264/219, 225, 22; 425/175, 384, 407, 547, 552

[56] References Cited

U.S. PATENT DOCUMENTS

| | | | |
|---|---|---|---|
| 3,880,563 | 4/1975 | DeVos | 425/384 |
| 4,105,184 | 8/1978 | Sumitomo | 249/79 |
| 5,130,161 | 7/1992 | Mansur et al. | 427/525 |
| 5,260,014 | 11/1993 | Holton et al. | 264/225 |

*Primary Examiner*—Jay H. Woo
*Assistant Examiner*—Robert B. Davis
*Attorney, Agent, or Firm*—Emch, Schaffer, Schaub & Porcello Co.

[57] ABSTRACT

Tooling for use in forming articles and a method for making same wherein the tooling includes a mold. The mold has a mold surface having an interior and an exterior. A plurality of metallic strands are positioned adjacent to the interior of the mold surface. The mold further includes at least one metallic heat transfer tube for containing a fluid cooling agent. One or more heat transfer rods can also be positioned in the mold. A layer of a plastic material is placed adjacent the interior of the mold surface. The plastic material surrounds the metallic strands and the metallic heat transfer tubes and rods. When heat is produced on the mold during a molding operation, the heat is transferred through the metallic strands and the heat exchange tubes and rods. The heat is dissipated by the cooling affect caused by the cooling fluid in the tubes. The method of the present invention includes the steps of: (a) applying a first layer of a plastic material on a form mold to form a mold surface, the mold surface having an interior and an exterior; (b) placing a plurality of metallic strands near the interior of the mold surface after curing the first layer; (c) positioning at least one metallic heat transfer tube in communication with the metallic strands; (d) applying additional plastic material to cover the metallic strands and the heat transfer tubes; and (e) releasing the mold from the form mold. Preferably the mold halves are received and supported by metal bases.

26 Claims, 5 Drawing Sheets

TOOLING AND METHOD OF MAKING

BACKGROUND OF THE INVENTION

The present invention is directed to tooling for use in forming articles. More specifically, the invention is directed to a plastic or polymer composite mold that incorporates metallic strands, metallic heat transfer rods and metallic tubes that contain a fluid cooling agent. The metallic components of the mold allow for the efficient transfer of heat away from the mold surface. The invention is also directed to a method for making such a mold.

Prior art plastic or polymer composite molds do not include effective means to transfer heat away from the mold surface during a molding operation. These prior art molds had a relatively short production life and were only capable of producing a small number of parts. Often, these prior art molds were used for making a limited number of prototypes.

The present invention relates to an improved plastic or polymer composite mold which incorporates metallic components, usually made of copper, that act as heat transfer mechanisms to draw heat away from the mold surface. This extends production life of the mold thereby enabling the plastic tooling to used for limited production runs.

SUMMARY OF THE INVENTION

The present invention is directed to a polymer composite or plastic mold for use in forming articles and a method of making same. The plastic mold includes a mold surface having interior and exterior layers. A layer of interconnecting metallic strands are positioned adjacent to the interior wall of the mold surface. The mold further includes several metallic tubes in communication with the metallic strands for containing a fluid cooling agent. At least one metallic heat transfer rod can also be in communication with the metallic strands and the metallic tube. A layer of a plastic material is placed adjacent to the interior wall of the mold surface. The plastic material surrounds the metallic strands and the metallic tube. Preferably the rods and tubes are pre-wrapped with the metallic strand material to ensure maximum heat transfer contact. When heat is produced on the mold surface, such as during a molding operating, the heat is transferred through the metallic strands, into the tubing and, if used, into the metallic rod. The heat is then dissipated by the heat transfer through the fluid cooling agent in the metallic tube or tubes.

The method of the present invention includes the steps of: (a) applying a first layer of a plastic material on a mold form to construct an acceptable mold surface, the mold surface having an interior wall; (b) placing metallic strands near the interior wall of the mold surface; (c) positioning at least one metallic tube in communication with the metallic strands; (d) applying a second layer of a plastic material to cover the metallic strands and the metallic tube; and (e) releasing the mold from the mold form.

It is the primary object of the present invention to provide a limited production mold and a method for making same.

It is an another object of the invention to provide a plastic mold that is durable with improved heat transfer characteristics.

It is an still another object of the invention to provide a method for making a mold that is efficient.

Other objects and advantages of the invention will become apparent as the invention is described hereinafter in detail with reference being made to the accompanying drawings.

DETAILED DESCRIPTION OF THE PREFERRED EMBODIMENTS

Figure 1:
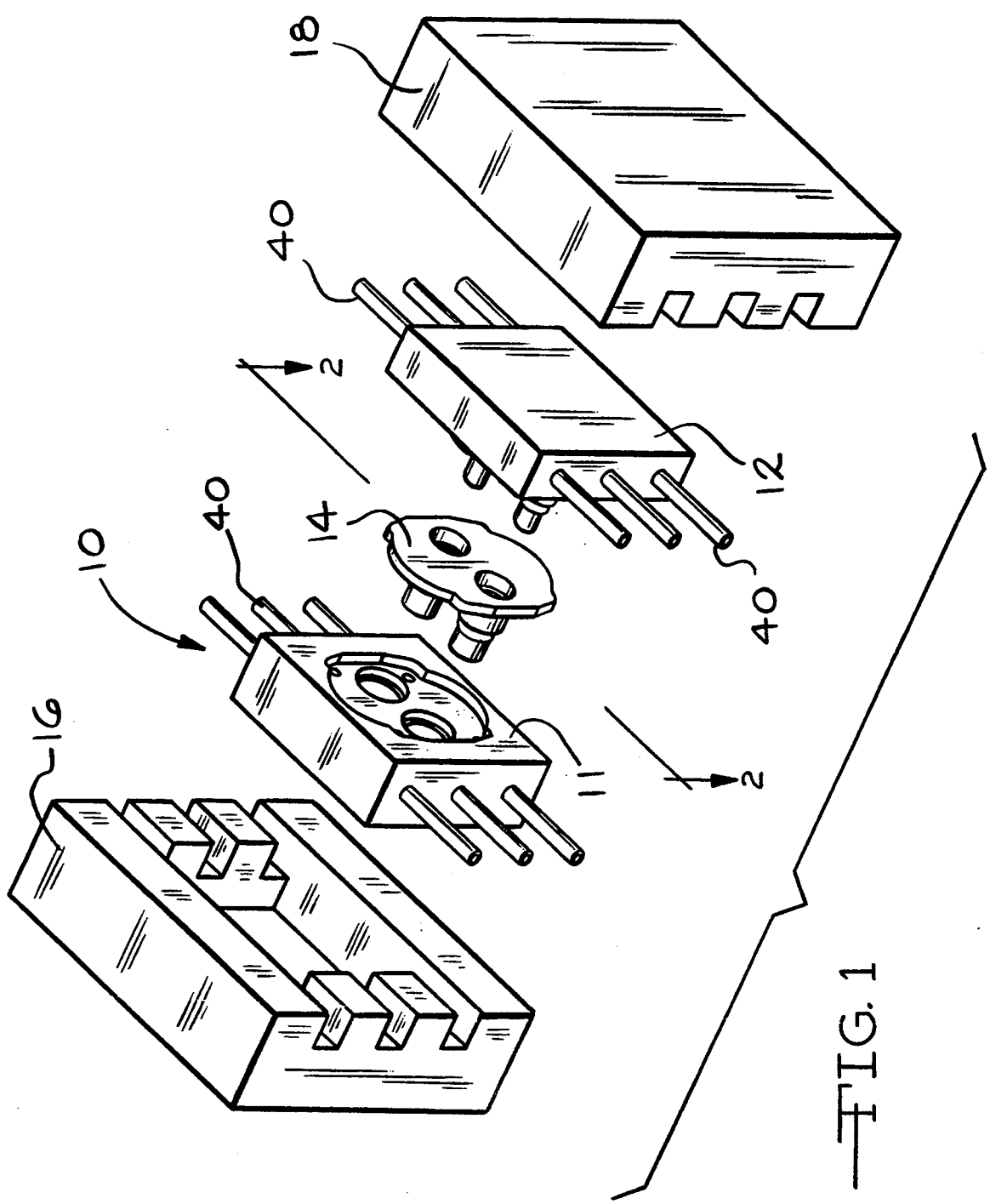
FIG. 1 is an exploded perspective view of a mold according to the present invention showing a finished part positioned between the mold halves.

Referring to the drawings, and in particular FIG. 1, the plastic mold according to the present invention is indicated by the reference number 10. The term plastic mold as used herein includes plastic composite molds. As shown in FIG. 1, the mold 10 includes the female half 11 and the male half 12. When the mold is used to form a part, such as plastic part 14, the mold halves 11 and 12 are positioned within and surrounded by metal bases 16 and 18. The metal bases 16 and 18, for example steel bases, support the mold halves to resist pressures during material injection into the mold halves.

Figure 2:
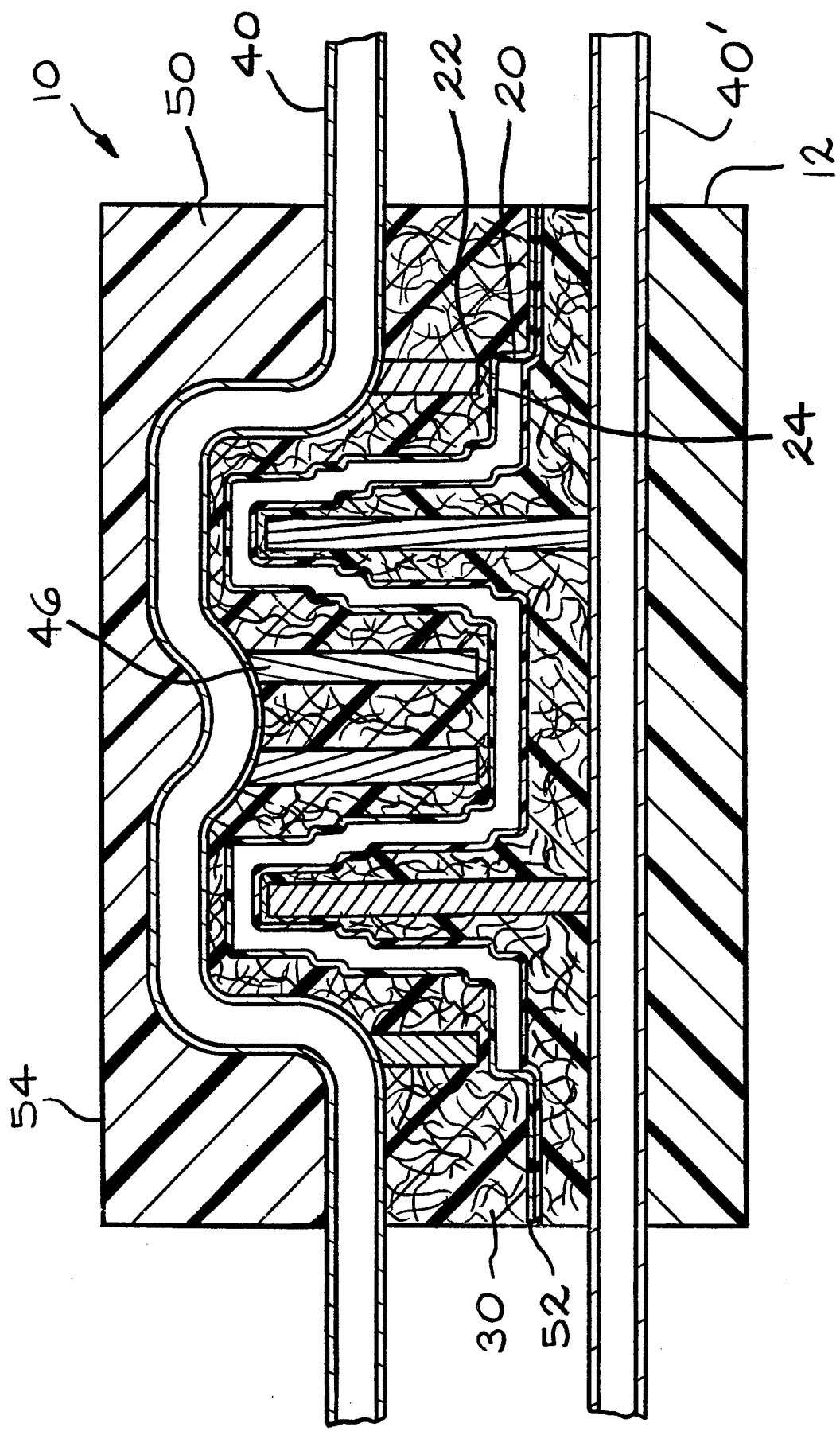
FIG. 2 is a sectional view taken along line 2—2 of FIG. 1 showing the mold of the present invention, with the metal bases removed for clarity, in a closed position.

Referring to FIG. 2, the mold 10 includes a first layer forming a mold surface 20 having an interior wall 22 and an exterior wall 24. The mold surface 20 is made of a plastic material. It has been found that a suitable plastic material is an epoxy resin because of its tough, dimensionally stable and chemically resistant properties. It has also been found that epoxy resin is particularly advantageous because of its low shrinkage and the absence of volatiles. As described in further detail below, the mold surface is formed using a pour-and-cure technique.

Figure 8:
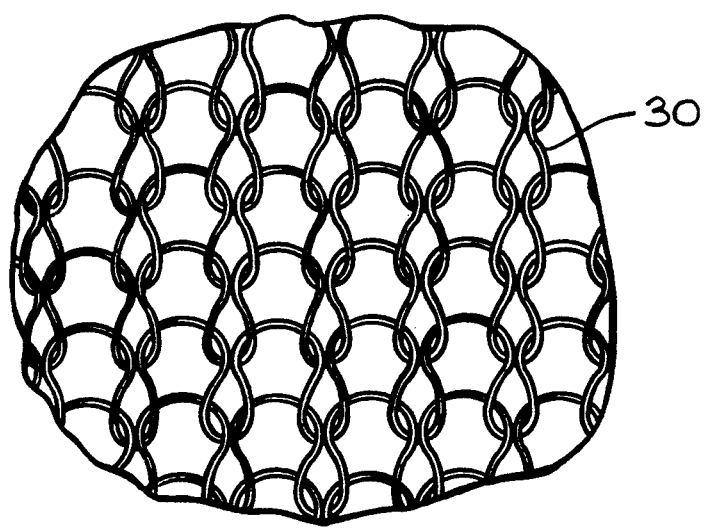
FIG. 8 is an enlarged view of metallic strands used in the present invention in the form of a woven mat.

Still referring to FIG. 2, a layer of metallic filaments or strands 30 are adjacent to the interior wall 22 of the mold surface 20. The metallic strands 30 should have physical properties that allow them to conduct heat. It has been found that pure copper has such properties thereby making it particularly suitable for use in the present invention. The strands 20 can be individual filaments or strands formed into wool as shown in FIG. 8. If the strands are in the form of wool, as shown in FIG. 8, the wool can be composed of a plurality of woven loops. The individual loops preferably are from about 5 to 10 mm in length to from about 3 to 7 mm in width. The layer of metallic strands 30 serve as heat exchange means to remove heat from the mold surface 20.

As shown in FIGS. 1 and 2, the mold 10 includes additional heat exchange means including at least one metallic tube 40. As shown in the FIG. 1 embodiment, the mold 10 includes three heat exchange tubes 40. However, it should be understood that the number of tubes 40 used with a mold 10 varies. It has been found that a variety of metals can be used to construct the tubes 40. However, copper is a preferred material. Referring to FIG. 2, the tube 40 is formed to follow the contour of the mold surface 20. This allows for a more efficient heat dissipation along the surface of the interior mold surface 22. A straight heat exchanger tube 40' can also be used as shown in FIG. 2 with male mold 12 or female mold 11. The tube 40 is usually positioned approximately 1 cm from the interior wall 22 of the mold surface 20 for maximum efficiency. However, the positioning of the tube 40 in relation to the interior wall 22 is sometimes limited and, therefore, heat transfer rods 46 are incorporated. When the mold 10 is used in a molding operation, a fluid cooling agent, such as water, is passed through the tube 40 to create a cooling affect. This allows for rapid heat transfer and dissipation.

Still referring to FIG. 2, the mold 10 shown in this embodiment includes still additional heat exchanger means including at least one solid heat transfer rod 46. In the FIG. 2 embodiment of the mold 10, four rods 46 are included. However, any number of rods can be used depending on situations where placement of tubes 40 are limited. The heat transfer rod 46 can be made of a variety of metals. However, it has been found that copper has the necessary heat conductivity properties for use in most applications. The rod 46 is in communication with and extends outwardly from the tube 40 to a point adjacent to the interior wall 22 of the mold surface 20. The rod 46 when so positioned is in heat transfer communication with the metallic strands 30. This allows for the heat produced on the mold surface 20 to be transferred to the metallic strands 30 and the metallic rod 46 (or rods). The heat is then dissipated by the cooling affect caused by the fluid cooling agent passing through the metallic tube 40, which is in heat transfer communication with the rod 46.

Figure 9:
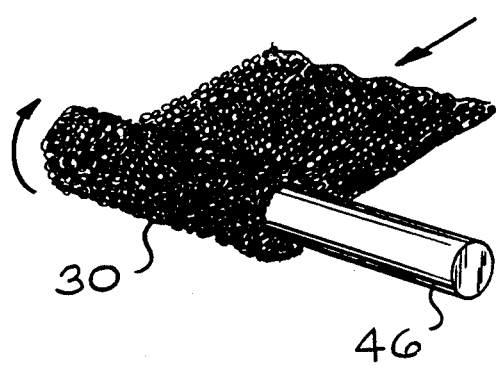
FIG. 9 is a diagrammatic view showing the metallic strands being wrapped tightly around a heat transfer rod.
Figure 10:
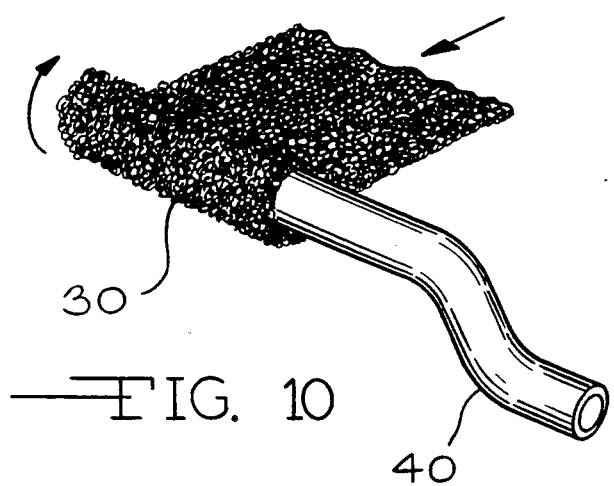
FIG. 10 is a diagrammatic view showing the metallic strands being wrapped around a heat transfer tube.

Referring to FIG. 9, a rod 46 is shown being pre-wrapped with metallic strand material 30. Referring to FIG. 10, the heat exchange tubes 40 can also be pre-wrapped with metallic strands 30. The pre-wrapping ensures maximum heat transfer contact.

As shown in FIG. 2, a second layer or core 50 made of plastic material is positioned adjacent to the interior wall 22 of the mold surface 20. If desired, the first layer of plastic forming the mold surface 20 and the second layer of plastic forming the core 50 can be combined and the mold surface 20 and core 50 formed at the same time during a single application of plastic material. The core has an interior surface 52 and an exterior surface 54. The core 50 surrounds the metallic strands 30, the metallic tubes 40 and the metallic rods 46. It has been found that a variety of plastic materials can be used to form the core 50 and the mold surface 20. It is important, however, that the plastic material for the core and the mold surface have a coefficient of thermal expansion similar to that of metallic components that may be protruding from the face of the mold, which are replacing otherwise plastic features to extend tool life. It has been found that epoxy resin is a material having the necessary thermal resistance, surface porosity and toughness for use in the present invention.

Another material which can be used to form the mold surface 20 and the core layer 50 is a P.E.A. material. One P.E.A. material (1,3 phenylene bisoxazoline) which can be used is manufactured by Ashland Chemical and sold under the designation AEOTECH 6000 SERIES.

The metallic strands 30, such as copper strands, should preferably be treated to enhance the bond between the strands and the resin. Etching the strands with acid or pre-coating are viable enhancement methods.

Figure 3:
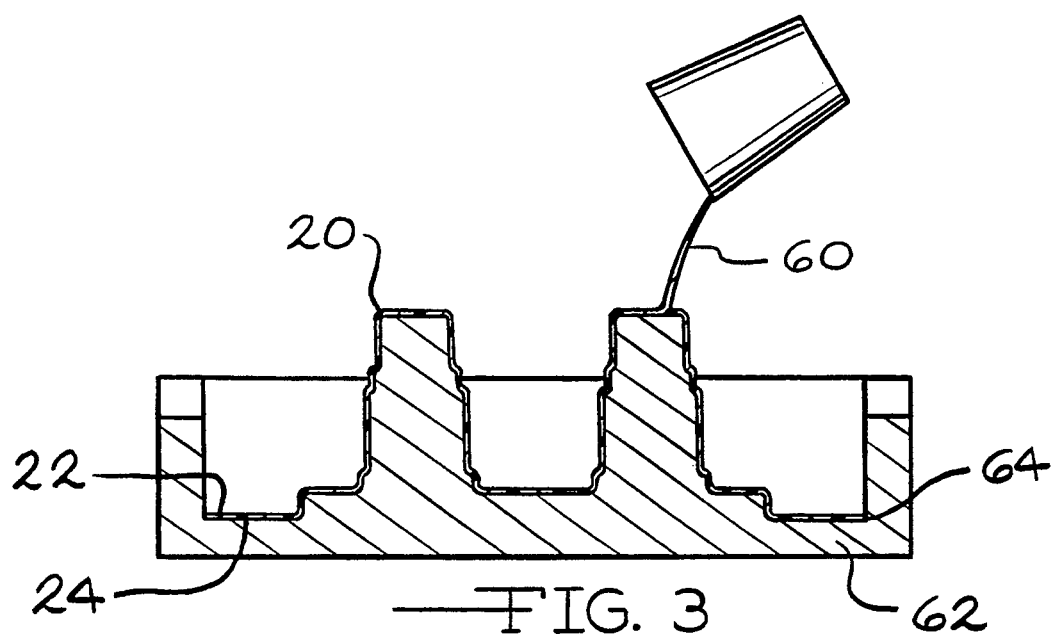
FIG. 3 is a sectional side view showing the plastic material of the mold surface being poured on a mold form.

The method of the present invention will now be described with reference being made to FIGS. 3 through 7. Referring now to FIG. 3, a first layer of a plastic material 60, such as an epoxy resin, is applied to a mold form 62. The word "apply", "applied" or "applying" as used herein is defined as the act of applying by pouring, spraying, brushing, injecting or otherwise placing the plastic material in the mold form. In the present embodiment, a conventional pour-and-cure method is used. Similarly while a container is showing in FIGS. 3 and 6, this is not meant to exclude other methods of application, such as brushing and spraying. The mold form 62 can be made of a variety of materials, including steel. In many constructions the mold will be formed using a stereolithography model. The contact surface 64 of the mold form 62 is usually treated with a release agent that eases in the removal of the final mold when it is complete. The plastic material 60 forms a mold surface 20 having an interior surface 22 and an exterior surface 24.

Figure 4:
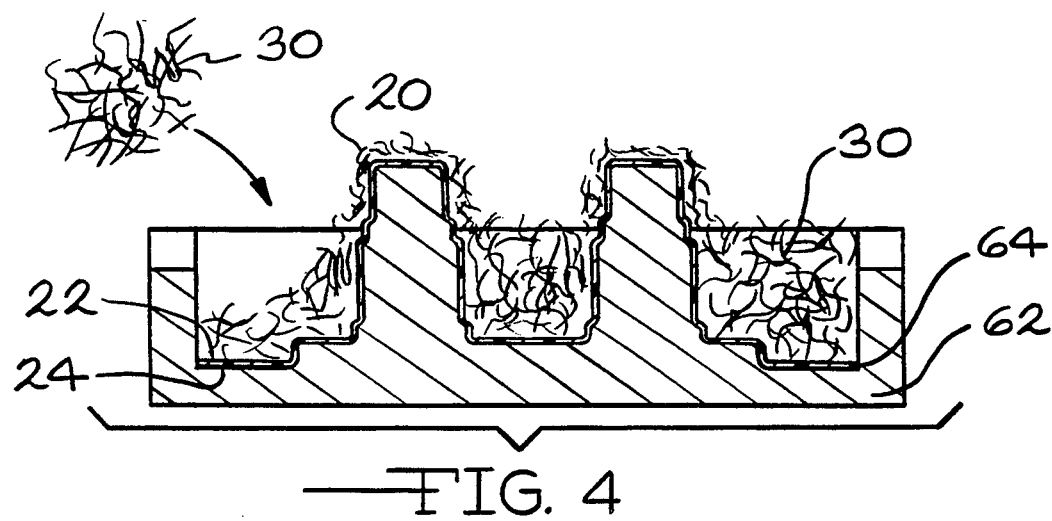
FIG. 4 is a sectional side view of metallic strands being placed near the interior wall of the mold surface.

As shown in FIG. 4, after curing of the layer 60, metallic filaments or strands 30 are placed or packed near the interior wall 22 of the mold surface 20. The strands 30 can be made from a variety of materials, as described above, with copper being preferred. The strands 30 can be individual strands or a woven wool. If the strands 30 are in the form of woven wool, the wool is composed of a plurality of loops wherein the individual loops are from about 5 to 10 mm in length to from about 3 to 7 mm in width.

Figure 5:
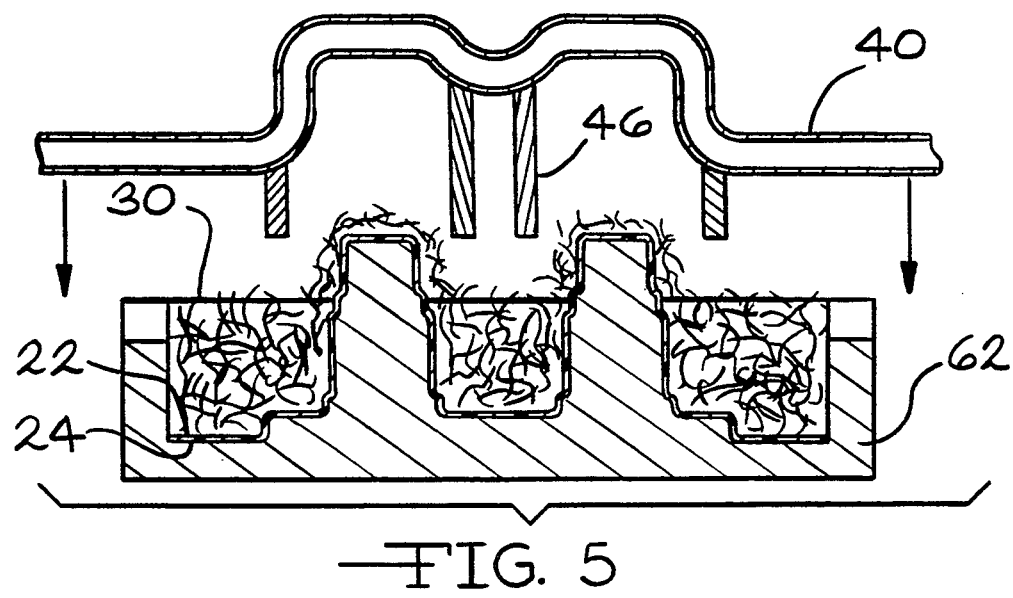
FIG. 5 is a sectional view of a metallic tubing and metallic heat transfer rods being positioned adjacent to the metallic strands.

Referring to FIG. 5, metallic tubes 40 and profiled heat transfer rods 46 are positioned so that the rods 46 are in thermal communication with the metallic strands 30. For greater heat conductivity, it is preferred that the rods 46 are positioned adjacent to the interior wall 22 of the mold surface 20. It is also preferable that the metallic strands 30 are compressed together to achieve maximum density and conductivity. It has been found that the metallic tubes 40 and the metallic rods 46 can be made of a variety of metals, with copper being preferred.

Figure 6:
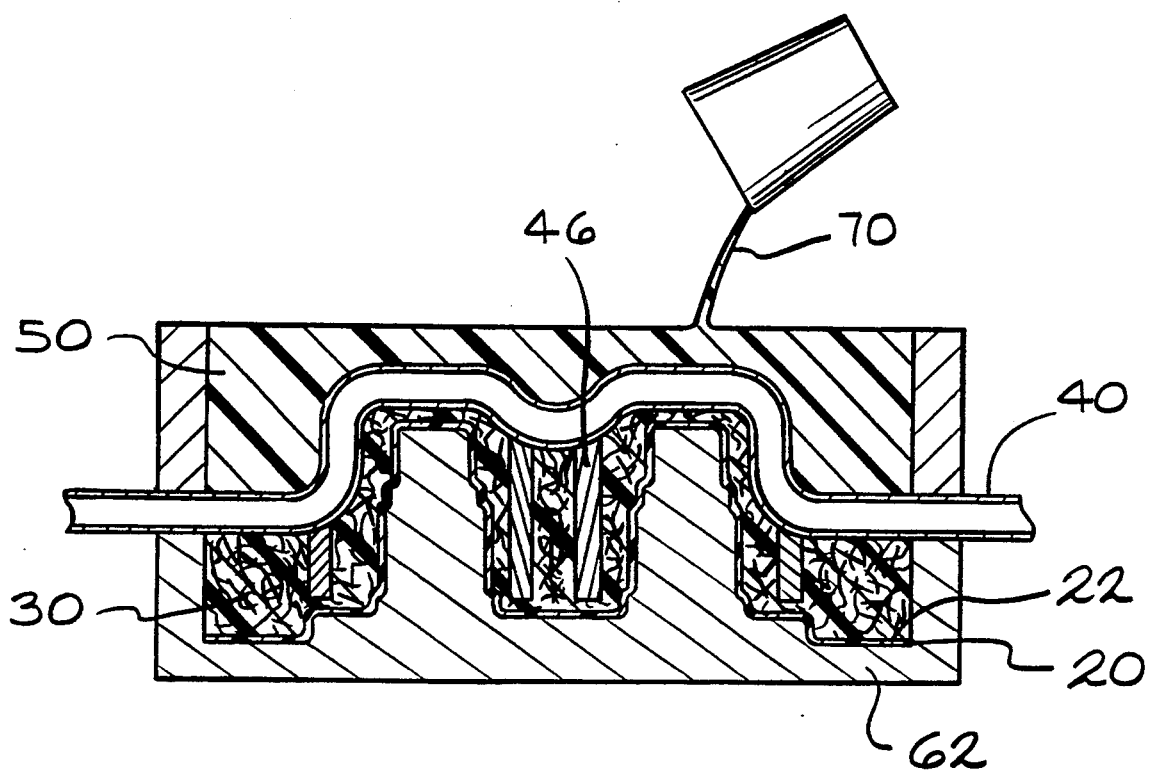
FIG. 6 is a sectional view of a second plastic layer being poured adjacent to the interior wall of the mold surface and surrounding the metallic components.
Figure 7:
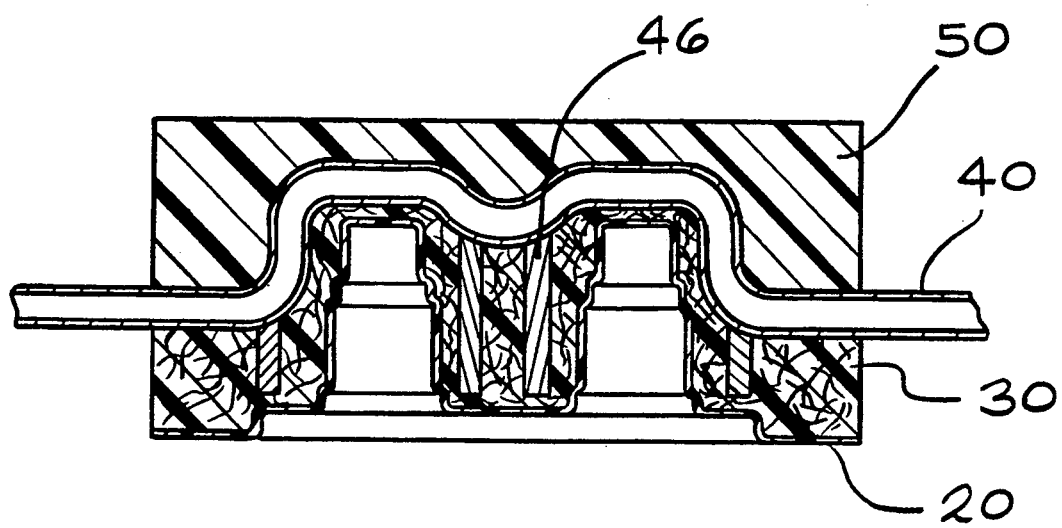
FIG. 7 is a sectional view of the finished mold half according to the present invention.

As shown in FIG. 6, a second layer of plastic material 70 is applied adjacent to the interior surface 22 of the mold surface 20 to form the core 50. In the present embodiment, the pour-and-cure method is used to form the core 50. The core 50 surrounds the metallic strands 30, which have been wrapped tightly around the metallic tubes 40 and the metallic rods 46. The metallic strands 30 are also compressed into the remaining areas, maintaining contact between all components. As described above, the plastic material 70 can be an epoxy resin material or a P.E.A. material depending on the application.

After curing, the female mold half 11 is removed from the mold form 62 and positioned in the steel base 16 (see FIG. 1). The male mold half 12 is constructed in the same manner is described above with respect to the female mold half 11.

In some embodiments, the mold surface is hardened with high energy ion bombardment.

The completed mold 10, according to the present invention, is illustrated in FIG. 1.

The above detailed description of the present invention is given for explanatory purposes. Numerous changes and modifications can be made to the invention described above. The scope of the invention is defined solely by the appended claims.

I claim:

1. Tooling for use in forming limited production articles comprising, in combination:
 a mold surface composed of a first layer of a plastic material, said mold surface having interior and exterior walls;
 a layer of compressed metallic strands positioned adjacent to said interior wall of said mold surface;
 at least one metallic heat exchange tube for containing a fluid cooling agent in thermal communication with said strands;
 at least one solid metallic heat transfer rod in thermal communication with said strands and said heat exchange tube, said heat transfer rod being attached to said heat exchange tube, said heat transfer rod extending outwardly from said tube to a point adjacent to said interior wall of said mold surface; and
 a second layer of plastic material positioned adjacent to said interior wall of said mold surface to form a mold core, said second layer surrounding and containing said strands, said heat exchange tube and said heat transfer rod, whereby as heat is produced on said mold surface, said heat is transferred to said strands and said heat transfer rod, said heat being dissipated by heat transfer through said fluid cooling agent in said heat exchange tube.

2. The mold of claim 1, wherein said mold surface is composed of an epoxy resin.

3. The mold of claim 1, wherein said surface is composed of a P.E.A. material.

4. The mold of claim 1, wherein said metallic strands are composed of copper.

5. The mold of claim 1, wherein said metallic strands are composed of copper wool.

6. The mold of claim 5, wherein said copper wool is comprised of a plurality of loops.

7. The mold of claim 1, wherein said metallic heat exchange tube is composed of copper.

8. The mold of claim 1, wherein said metallic heat transfer rod is composed of copper.

9. The mold of claim 1, wherein said core is composed of an epoxy resin.

10. The mold of claim 1, wherein said core is composed of a P.E.A. material.

11. The mold of claim 1, including a metallic base for receiving said core, wherein said core has an inner surface adjacent to the interior wail of said mold surface and an exterior surface adjacent to a metallic base.

12. The method for making a mold, which comprises the steps of:
 (a) applying a first layer of a plastic material on a mold form to construct a mold surface, said mold surface having an interior and an exterior;
 (b) placing a plurality of metallic strands near said interior of said mold surface;
 (c) positioning at least one metallic heat exchange tube in thermal communication with said metallic strands;
 (d) positioning at least one solid metallic heat transfer rod in thermal communication with said metallic heat exchange tube, and said plurality of metallic strands:
 (e) applying a second layer of a plastic material to cover and Contain said plurality of metal strands, said metallic heat exchange tube and metallic heat transfer rod; and
 (f) releasing said mold from said mold form.

13. The method of claim 12, including the step of hardening the mold surface with high energy ion bombardment.

14. The method of claim 12, including surrounding the mold with a metal base to support the mold.

15. The method of claim 12, wherein said first layer of plastic material and said additional plastic material comprises an epoxy resin.

16. The method of claim 12, wherein said first layer of plastic material and said additional plastic material comprises a P.E.A. material.

17. The method of claim 12, wherein said metallic strands are composed of copper.

18. The method of claim 12, wherein said metallic strands are copper wool.

19. The method of claim 12, wherein said copper wool includes a plurality of loops.

20. The method of claim 12, wherein said metallic tube is composed of copper.

21. The method of claim 12, wherein said metallic heat transfer rod is composed of copper.

22. The method of claim 12, wherein said metallic heat transfer rod is positioned adjacent to said interior of said mold surface.

23. The method of claim 12, wherein said additional plastic layer is composed of an epoxy resin.

24. The method of claim 12, wherein said additional plastic layer is composed of a P.E.A. material.

25. The method of claim 12, including the step of pre-wrapping said heat transfer rod and said heat transfer tube with metallic strands.

26. The mold of claim 1, wherein said metallic strands are wrapped around said metallic heat transfer rod.

* * * * *